United States Patent
Gildea

(10) Patent No.: US 12,450,042 B2
(45) Date of Patent: Oct. 21, 2025

(54) INPUT DRIVEN EXECUTION RANDOMISATION

(71) Applicant: Verimatrix, Meyreuil (FR)

(72) Inventor: Nicholas Gildea, London (GB)

(73) Assignee: Verimatrix UK LTD, London (GB)

( * ) Notice: Subject to any disclaimer, the term of this patent is extended or adjusted under 35 U.S.C. 154(b) by 199 days.

(21) Appl. No.: 18/282,762

(22) PCT Filed: Jun. 21, 2021

(86) PCT No.: PCT/EP2021/066829
§ 371 (c)(1),
(2) Date: Sep. 18, 2023

(87) PCT Pub. No.: WO2022/199864
PCT Pub. Date: Sep. 29, 2022

(65) Prior Publication Data
US 2024/0168740 A1    May 23, 2024

Related U.S. Application Data

(60) Provisional application No. 63/166,738, filed on Mar. 26, 2021, provisional application No. 63/172,579, filed on Apr. 8, 2021.

(51) Int. Cl.
*G06F 8/41* (2018.01)
*G06F 21/60* (2013.01)
*H04L 9/06* (2006.01)

(52) U.S. Cl.
CPC .............. *G06F 8/447* (2013.01); *G06F 8/433* (2013.01); *G06F 21/602* (2013.01); *H04L 9/0662* (2013.01)

(58) Field of Classification Search
CPC ............................. G06F 21/125; G06F 8/447
See application file for complete search history.

(56) References Cited

U.S. PATENT DOCUMENTS

| | | | |
|---|---|---|---|
| 9,438,624 B2 * | 9/2016 | Fine | H04L 63/1466 |
| 9,965,623 B2 * | 5/2018 | Johnson | H04L 9/0631 |

(Continued)

FOREIGN PATENT DOCUMENTS

| | | | | |
|---|---|---|---|---|
| CN | 112149118 A | * | 12/2020 | G06F 12/0882 |
| EP | 2009572 A1 | | 12/2008 | |

(Continued)

OTHER PUBLICATIONS

International Search Report and Written Opinion of PCT/EP2021/066829, mailed Dec. 8, 2021 in 12 pages.

*Primary Examiner* — Francisco J Aponte
(74) *Attorney, Agent, or Firm* — Procopio, Cory, Hargreaves & Savitch LLP

(57) ABSTRACT

Embodiments of systems, devices and methods for protecting computer programs against analysis and/or attacks that rely on synchronized ordering and repeatability are provided herein. Embodiments disclosed herein include receiving input source code, the source code comprising code instructions of a computer program; generating a graph structure representative of the code instructions comprising nodes representative of portions of the code instructions and links representative of dependencies between the portions of the code instructions, wherein the nodes can be traversed in a plurality of orders without invalidating the dependencies between the portions of the code instructions; constructing a plurality of function definitions based on the graph structure, each function definition configured to execute one or more nodes of the graph structure and each node of the graph structure is executable by one or more function definitions; transforming the input source code into transformed source code based on combining the graph structure and the plurality of function.

16 Claims, 7 Drawing Sheets

(56) References Cited

U.S. PATENT DOCUMENTS

| | | | |
|---|---|---|---|
| 10,402,179 B1* | 9/2019 | Powers | G06F 9/54 |
| 10,409,966 B2* | 9/2019 | Gu | G06F 8/41 |
| 10,412,114 B1* | 9/2019 | Powers | H04L 63/1425 |
| 10,412,116 B1* | 9/2019 | Powers | G06F 9/44505 |
| 11,354,218 B2* | 6/2022 | Fischer | G06F 11/3612 |
| 11,403,101 B1* | 8/2022 | Sugumar | G06F 21/75 |
| 11,507,673 B1* | 11/2022 | Ouzan | G06F 21/552 |
| 11,604,873 B1* | 3/2023 | Mukherjee | G06F 21/566 |
| 11,860,996 B1* | 1/2024 | Pizlo | G06F 8/434 |
| 2010/0246808 A1* | 9/2010 | Hisakado | H04L 9/0618 |
| | | | 380/1 |
| 2016/0140340 A1* | 5/2016 | Walters | G06F 21/556 |
| | | | 726/22 |
| 2016/0285896 A1* | 9/2016 | Caprioli | G06F 21/556 |
| 2017/0177314 A1* | 6/2017 | Powers | G06F 8/30 |
| 2017/0255416 A1* | 9/2017 | Zhang | G06F 21/53 |
| 2017/0337358 A1* | 11/2017 | Stewart | G06F 12/145 |
| 2018/0211017 A1* | 7/2018 | Homescu | G06F 21/14 |
| 2020/0151305 A1* | 5/2020 | Lam | G06F 8/41 |
| 2020/0409673 A1* | 12/2020 | Goodwin | G06F 8/433 |
| 2020/0409711 A1* | 12/2020 | Constable | G06F 9/3806 |
| 2021/0049289 A1 | 2/2021 | Morchon et al. | |
| 2021/0110046 A1* | 4/2021 | McIntosh | G06F 21/577 |
| 2021/0144170 A1* | 5/2021 | Ganapathy | H04L 63/1475 |
| 2022/0083347 A1* | 3/2022 | Constable | G06F 9/4418 |
| 2022/0214866 A1* | 7/2022 | Li | G06F 8/433 |
| 2023/0079426 A1* | 3/2023 | Ferguson | G06F 8/447 |
| | | | 717/140 |

FOREIGN PATENT DOCUMENTS

| | | | | |
|---|---|---|---|---|
| EP | 4290365 A2 | * | 12/2023 | G06F 8/4443 |
| GB | 2573177 A | * | 10/2019 | G06F 9/3842 |
| WO | WO-2019149630 A1 | * | 8/2019 | G06F 9/30054 |
| WO | WO-2022148276 A1 | * | 7/2022 | G06F 11/3628 |

* cited by examiner

300 ⟶

```
# assume x value defined
    v_0 := add x, 1
    v_1 := add v_0, 10
    v_2 := add v_0, 100
```

310 ⟶

400 u0 = input_0 | input_1
u1 = u0 | input_2
u2 = u1 ^ 0x775876ae
u3 = u2 >> 0x18

INPUT DRIVEN EXECUTION RANDOMISATION

RELATED APPLICATIONS INFORMATION

This application claims the benefit of U.S. provisional patent application Ser. No. 63/166,738, filed Mar. 26, 2021 and titled "INPUT DRIVEN EXECUTION RANDOMISATION," which is hereby incorporated by reference in its entirety. This application also claims the benefit of U.S. provisional patent application Ser. No. 63/172,579, filed Apr. 8, 2021 and titled "INPUT DRIVEN EXECUTION RANDOMISATION," which is hereby incorporated by reference in its entirety.

TECHNICAL FIELD

The present disclosure relates generally to the field of program security and to techniques for increasing the resistance of a computer program to exposing information due to leakage during execution. In particular, the present disclosure relates to methods, systems, and devices for protecting computer programs against analysis and/or attacks that rely on synchronized ordering and repeatability of the computer program.

BACKGROUND

In computer security, a side-channel attack aims to extract information (generally secret information) using information leaked during execution of the computer program. A side-channel attack is an attack based on information gained from execution of a computer program, rather than weaknesses in the executed algorithm itself. Over multiple executions of a computer program a dataset can be generated that may be used by side-channel attacks. These datasets are created by choosing an input value, running the target binary program code and capturing data generated by each binary instruction in the compiled code. A single input and sample set is known as a "trace". Side-channel attacks collect many synchronized traces to form a single dataset. From the dataset, information on the executed computer program can be acquired.

There is a need for increasing the resistance of computer programs from side-channel attacks that rely on the synchronized ordering and repeatability of computer programs to generate valid datasets for the attacks.

SUMMARY

In an aspect, a method of protecting a computer program against side-channel attacks is provided. The method includes receiving input source code of the computer program, the source code comprising code instructions of the computer program; generating a graph structure representative of the code instructions, the graph structure comprising nodes representative of portions of the code instructions and links representative of dependencies between the portions of the code instructions, wherein the nodes can be traversed in a plurality of orders without invalidating the dependencies between the portions of the code instructions; constructing a plurality of function definitions based on the graph structure, each function definition is configured to execute one or more nodes of the graph structure and each node of the graph structure is executable by one or more function definitions; transforming the input source code into transformed source code based on combining the graph structure and the plurality of function.

In another aspect, a system for protecting a computer program against side-channel attacks is provided. The system comprises at least one memory configured to store instructions and at least one processor communicatively connected to the at least one memory. The at least one processor configured to execute the program to perform the method described above.

In another embodiment, a device is provided for protecting a computer program against side-channel attacks. The device comprises a means for receiving input source code of the computer program, the source code comprising code instructions of the computer program; a means for generating a graph structure representative of the code instructions, the graph structure comprising nodes representative of portions of the code instructions and links representative of dependencies between the portions of the code instructions, wherein the nodes can be traversed in a plurality of orders without invalidating the dependencies between the portions of the code instructions; a means for constructing a plurality of function definitions based on the graph structure, each function definition is configured to execute one or more nodes of the graph structure and each node of the graph structure is executable by one or more function definitions; and a means for transforming the input source code into transformed source code based on combining the graph structure and the plurality of function.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE INVENTION

Figure 1:
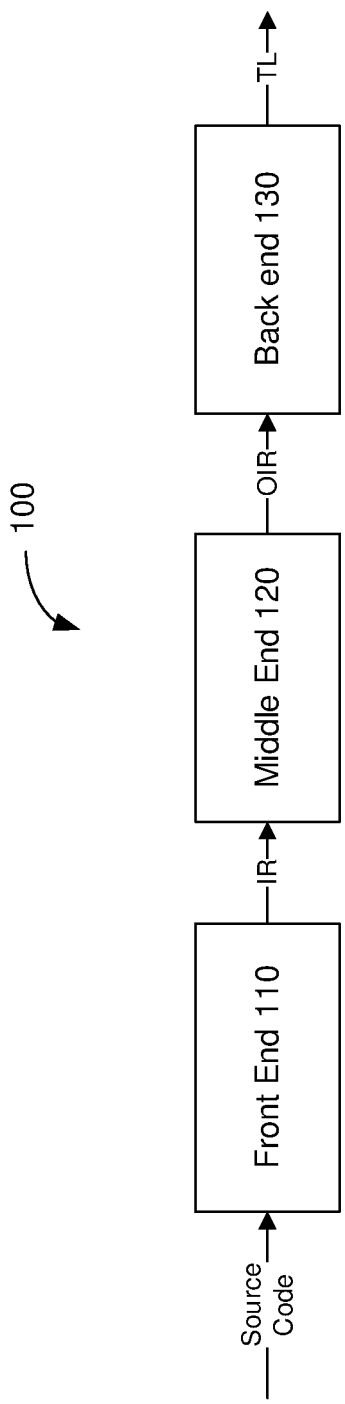
FIG. 1 is a functional block diagram of a compiler framework.

Embodiments disclosed herein provide for systems, methods, and non-transitory computer-readable media configured to provide datasets generated for use by side-channel attacks invalid. These datasets are created by attacks that choose an input value, run a target binary, and capture data generated by each binary instruction in the compiled code. Any misalignment reduces the signal to noise ratio of the information in the sample set that the attack is trying to extract—if the misalignment is high enough then the attack will fail. This means that a binary which is compatible with these attacks executes different inputs in the exact same way. Conversely, a binary which is incompatible with these attacks will make use of different code paths for different input values. The different code paths cause the traces to be "misaligned".

The embodiments disclosed herein provide for systems and methods that provide for the transformation of a computer program such that execution of the computer program with a unique input value(s) causes the transformed computer program to execute in a fashion which is unique to each input value. Two items are created to facilitate the per-input executions: (i) a graph representing the input source code having nodes which can be traversed in an arbitrary order without invalidating the semantics of the input source code and (ii) a set of function definitions such that each node of the graph can be executed on many functions and each function can execute many different nodes of the graph. At run-time, input value(s) supplied by an end user device are used to select an ordering of the graph and to select a valid function for each graph node yielding an execution specific to each input value. Each input value results in a unique ordering of the nodes of the graph and selection of a valid function to execute each node. This creates a new version of the input source code based on the input value, which executes in a highly variable fashion such that sampling of the execution data does not result in a dataset which can be used to perform side-channel attacks which rely on a synchronized ordering as the input value changes.

Embodiments disclosed herein can provide a defense against side-channel leakage attacks. Side-channel leakage analysis is a powerful attack which can extract secret information from executable code. These attacks rely on supplying unique input values to the target code and then reading values from memory (sampling) as the target code executes (typically after each binary instruction executes). These attacks are only possible if the same execution data is sampled in the same order across all sampled executions.

Embodiments disclosed herein can cause the code execution of the computer program to vary in such a way that the same execution data is rarely sampled in the same order across executions, breaking this category of side-channel attack. Each execution creates a new version of the input computer program which executes in a highly variable fashion such that sampling of the execution data does not result in a dataset which can be used to perform side-channel attacks which rely on a synchronized ordering as the input value changes.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "framework," "system," "component," "module," and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both a computer program running on a computer (or server and the like) and the computer (or the server and the like) can be a component. One or more components may reside within a process and/or thread of execution, and a component may be localized on one computer and/or distributed between two or more computers and/or servers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

As used herein, communicatively coupled or communicatively connected is used to refer to a wired connection and/or wireless connection between referenced components and/or devices. Connection may comprise communications and data exchanges over wired or wireless networks. Wireless networks may use standard communication network protocols, such as, but not limited to, Bluetooth, LTE 4G, 5G, GSM, CDMA, cellular network protocols and the like.

The following detailed description provides further details of the figures and example implementations of the present application. Terms used throughout the description are provided as examples and are not intended to be limiting. For example, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application. Similarly, the various processes and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

In order to better understand embodiments of the present invention, existing tools will be considered first. One such tool is a compiler framework as illustrated in FIG. 1. In computing, a compiler 100 is a computer program that translates computer code written in a first programming language (the source language) into a second language (the target language) for execution at a target device, such as end user devices. Generally, compilers are configured to translate source code from a high-level programming language (such as C, C++, or Objective-C, Python, Visual Basic, etc.) to a lower level language (e.g., assembly language, object code, or machine code) to create an executable program that is executed on a target system (for example an end user device). Machine code may be a stream of binary data (e.g., also referred to herein as the target binary) that the target system can process to execute the computer program.

The compiler framework generally comprises a front end 110, a middle end 120, and a back end 130. The front end 110 may be configured to scan the input source code provided in the first programming language and verify syntax and semantics according to the first programming language. For statically typed languages the front end 110 may perform type checking by collecting type information. Aspects of the front end 110 may include lexical analysis, syntax analysis, and semantic analysis. The front end 110 is configured to transform the input source code in the first programming language into an intermediate representation (IR). The IR may be a lower-level representation of the computer program with respect to the source code. An IR is the data structure or code used internally by a compiler or virtual machine to represent source code. Example front ends, include, but are not limited to, Clang which utilizes a LLVM compiler infrastructure, GNU Compiler Collection, Amsterdam Compiler Kit, etc. As an example, the Clang front end transforms input source code in C, C++, or Objective-C into an LLVM IR. Other examples of compilers that utilize a LLVM compiler infrastructure include, but are not limited Rust and emscripten (e.g., an example JavaScript compiler).

The middle end 120 performs optimizations on the IR from the front end 110 that are independent of the architecture of the target device. This independence may be intended to enable generic optimizations to be shared between versions of the compiler supporting different languages and target processors. The optimized IR is used by the back end 130.

The back end 130 performs more analysis, transformations and optimizations specific for the target device. The back end 130 generates the target-dependent assembly code, performing register allocation in the process. The output of a back end is machine code specialized for a particular processor and operating system of the target device. As an example, under the LLVM infrastructure, the back end 130 compiles the optimized IR into a stream of binary data for processing by the target device.

Under this traditional framework, a side-channel attack receives the target binary and executes the binary many times using different input values to generate a dataset and discover information about the program from the dataset based on the synchronization and repeatability of the execution. Under conventional approaches, the functions of the computer program executed in the binary are performed in the same order and are synchronized, which allows for generation of a dataset that is valid for such attacks.

Embodiments herein add a transformation engine configured to transform the source code of the computer program, such that execution with different input value(s) causes the computer program to be executed in a fashion that is unique to each input value. For example, the execution is randomized each time a different input value is used to execute the program. The unique execution for each input value provides for misalignment in datasets generated from multiple executions of the computer program. For example, a first misalignment is achieved by randomizing the order in which code instructions of the computer program are executed based on each input value. A second misalignment may also be achieved by randomizing function definitions that are used to execute each code instruction of the computer program based on each input value.

Figure 2:
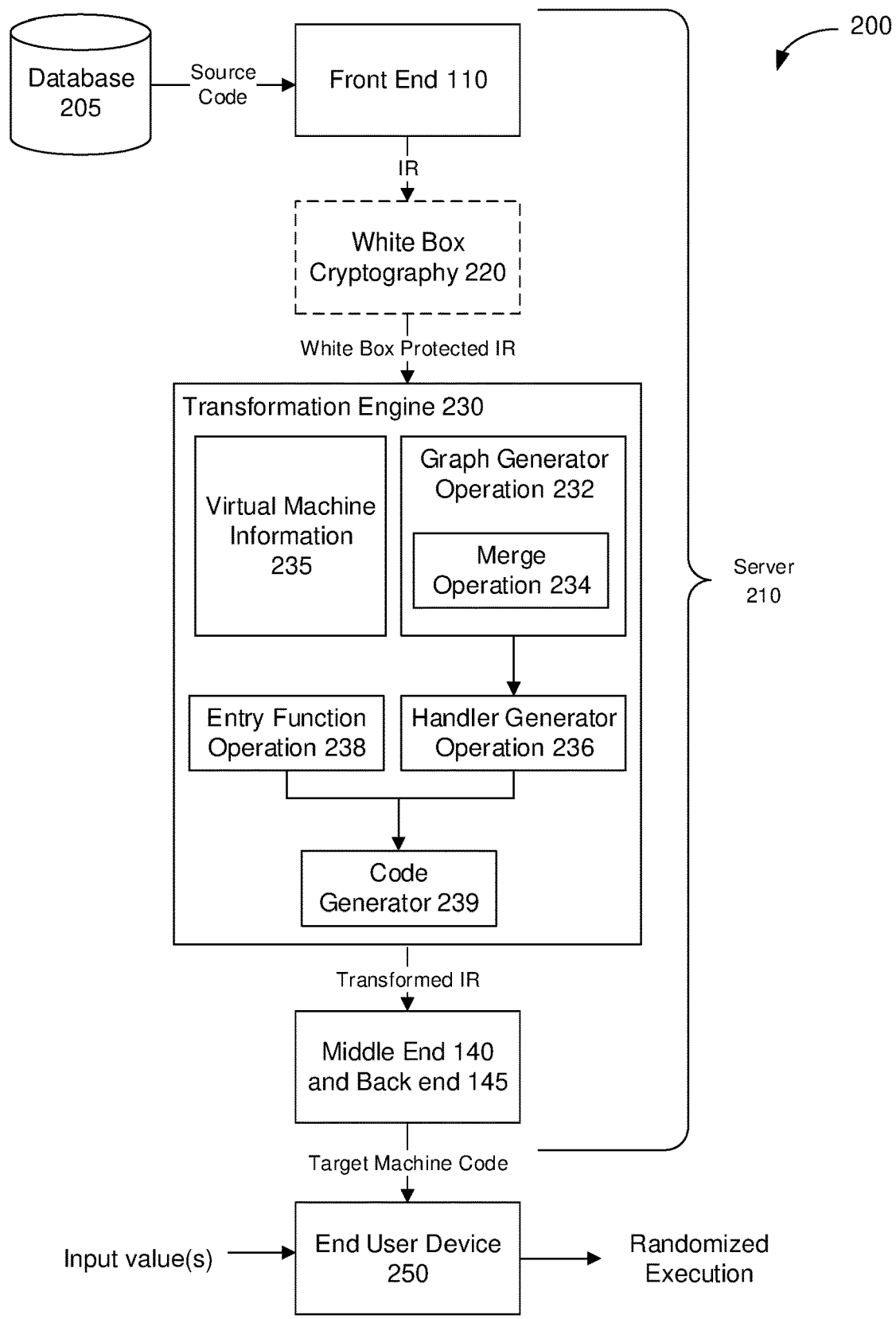
FIG. 2 is a functional block diagram of a computerized system including a transformation engine for randomized execution of a computer program in accordance with the embodiments disclosed herein.

FIG. 2 is a functional block diagram of a computerized system 200 including a transformation engine 230 for randomized execution of a computer program in accordance with the embodiments disclosed herein. The computerized system 200 comprises a server 210 coupled to a database 205 storing computer programs in source code written in a first program language. The server 210 is configured to execute a transformation engine 230 configured to transform the execution of source code input into the transformation engine 230 into a randomized execution. The server 210 may also be configured to execute a compiler 100 configured to translate the first programming language to a second programing language for execution of the computer program on an end user device 250.

The server 210 may be one or more dedicated servers, cloud instances that utilize shared resources of one or more servers, one or more virtual machines, and/or any computing system. These servers or cloud instances may be collocated and/or geographically distributed. The server 210 may be implemented as, for example, one or more of computing system 7 of FIG. 700. The server 210 may be communicatively connected to the end user device 250. The server 210 may also be communicatively connected to the databases 205.

The end user device 250 may comprise any type or types of computing devices capable of wired and/or wireless communication, including without limitation, desktop computers, laptop computers, tablet computers, smart phones or other mobile phones, wearable smart devices (e.g., smart watches, eyewear, and the like), servers, and the like. The end user device 250 may be implemented as, for example, a computing system 7 of FIG. 700. The end user device 250 may comprise an application, software, and the like executing on the end user device for interacting with the server 210 and executing the computer program. The end user device 250 may receive inputs, for example from an end user, and translate the inputs into input value(s) for executing machine code of the computer program at the end user device 250.

The server 210 may receive a request from the end user device 250 to execute the computer program. The server retrieves the source code of the computer program in a first programming language from the database 205 and provides the source code to the front end 110 as an input computer program (also referred to herein as an input algorithm). As describe above, the front end 110 transforms the source code of the input algorithm into an IR. For example, if the front end 110 is based on the LLVM infrastructure as its compiler framework (e.g., such as Clang), the front end 110 transforms input source code provided in C, C++, or Objective-C into an LLVM IR. Embodiments herein are not limited to front ends that are based on the LLVM infrastructure, any front end compiler that produces an IR may be used for supplying an IR. In various embodiments, the front end 110 is a compiler configured to transform the entire source code into an IR prior to execution by the end user device 250 (e.g., sometimes referred to herein as an "ahead of time compiler" and/or "ahead of execution compiler").

In some implementations, the IR output from front end 110 may be provided to an optional (as illustrated by dotted lines in FIG. 2) white box cryptography algorithm 220. The white box cryptography algorithm 220 may be configured to ingest the IR code from the front end 110 and combine methods of encryption and obfuscation to create secret keys within the structure or code of IR. A non-limiting example of a white box cryptography algorithm 220 is the pipeline in the Whitebox tool offered by Verimatrix™.

The IR from front end 110 or the white body protected IR from the white box cryptography algorithm 220 (if implemented) is input into transformation engine 230. The transformation engine 230 is configured to perform a graph generator operation 232 and optional merge operation 234 on the input IR to generate a graph structure representing the IR. The graph structure comprises a plurality of nodes representative of code instructions that make up the IR, which can be traversed in an arbitrary order without invalidating the semantics of the input IR. As used herein, portions of the code instructions may be referred to as chains, such that a chain may refer to a single code instruction or a group of code instructions. The graph structure may also include links between each node representative of the dependencies between each chain. The transformation engine 230 also performs a handler generator operation 236 based on the nodes and the links (e.g., pre- and post-chain dependencies) to generate a set of functions (also referred to herein as handlers) for executing the chains represented by the nodes, such that each chain of the graph structure can be executed on a plurality of functions and each function can execute a plurality of different chains.

The transformation engine 230 also comprises virtual machine information 235. The virtual machine information comprises data required for valid execution of the graph structure during run time. The virtual machine information 235 may include information on selection of a valid handlers for each chain during execution. The virtual machine information 235 may also include any additional data necessary for execution of the transformed source code. The virtual machine information 235 may be stored, for example, in a memory or database (e.g., one or more of main memory 715 and secondary memory 720).

Figures 3A, 3B:
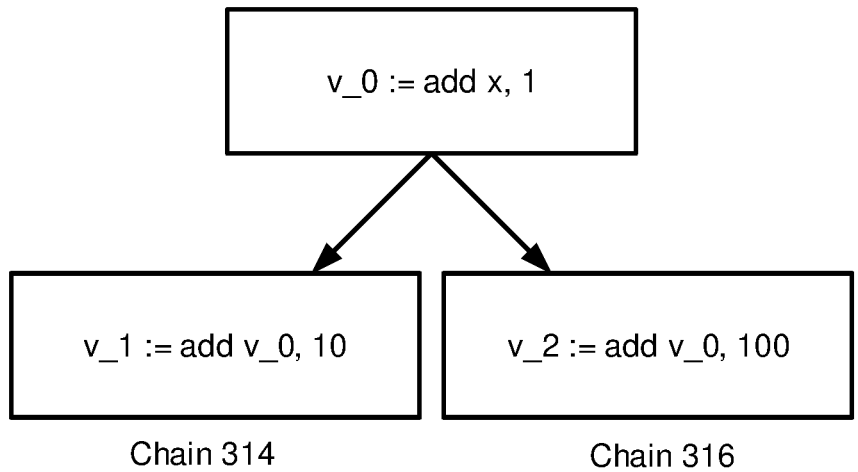
FIG. 3A illustrates source code of an example input intermediate representation (IR) input into the transformation engine of FIG. 2 in accordance with embodiments disclosed herein.
FIG. 3B illustrates an example graph structure constructed from the input IR of FIG. 3A in accordance with embodiments disclosed herein.

FIG. 3A illustrates source code of an example input IR 300 input into the transformation engine in accordance with embodiments disclosed herein. Source code may be input from the front end 110 or the white box cryptography algorithm 220. In the illustrative example of FIG. 3A, the code instructions of the input IR 300 is expressed in Static Single Assignment (SSA) form. SSA form is a code representation in which there is a constructible Directed Acyclic Graph (DAG) connecting the code instructions. The DAG can be constructed by generating a node for each portion of the code instructions (e.g., each chain). Links between the nodes are defined by the pre- and post-dependencies between code instructions. Code instructions in the input IR may contain two types of dependencies, implicit and explicit dependencies. Explicit dependencies are encoded in the SSA form, for example, an instruction which reads a value X has the value which writes X as a "pre-dependency". Implicit dependencies arise from code instructions that operate on the same memory addresses, for example, if the input code instructions contains a stored operation to address A followed by a load from address A then there is an implicit dependency that the store must precede the load. The equivalence of memory addresses may be determined, for example, by alias analysis, which is a well-established compiler construction technique.

FIG. 3B illustrates an example DAG 310 constructed from the input IR 300 in accordance with embodiments disclosed herein. The DAG 310 may be constructed, for example, by the graph generator operation 232. The graph generator operation 232 examines the source code of the input IR 300 to identify distinct portions of the code instructions in the IR 300 and constructs a node for a portion of the code instructions. For example, as shown in FIG. 3B, separate nodes for each of chain 312-316 are constructed, each chain representing a line of the code instructions. The graph generator operation 232 also constructs links between each node based on the pre- and post-chain dependencies. That is, links are defined based on how value(s) generated in a preceding chain are to be used in a connected chain (e.g., if instruction for chain 312 generates value v_0 and instruction for chain 314 uses value v_0 then instruction for chain 312 is a predecessor of instruction for chain 314). The resulting graph structure of nodes and links is a complete and valid representation of the input IR.

Execution of the input IR can now be performed by traversing the graph structure in any valid order, executing each chain of instructions as each node is reached. A valid order may refer to traversing nodes in an order that does not invalidate the dependencies between executed instructions. That is, using the above example, instruction for one or more chain 314 and 316 must be executed after instruction 312 due to the use of value v_0; however, chains 314 and 316 may be executed in any order.

Figures 4A, 4B:
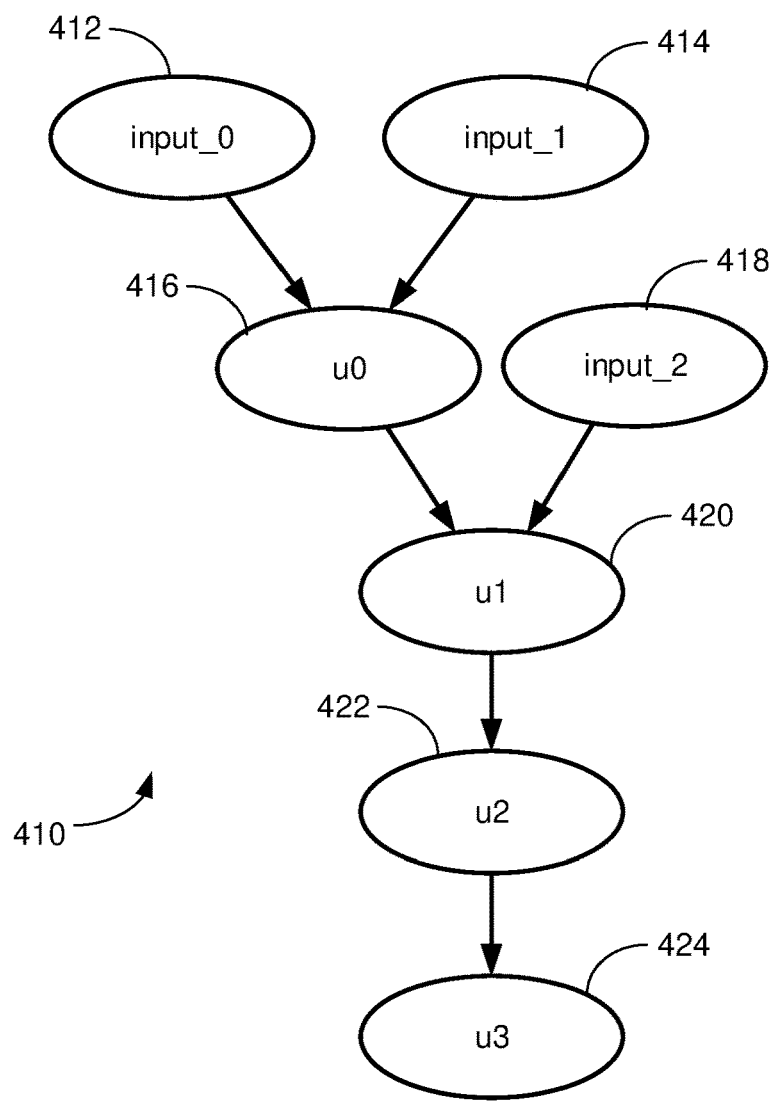
FIG. 4A illustrates source code of another example input IR input into the transformation engine of FIG. 2 in accordance with embodiments disclosed herein.
FIG. 4B illustrates an example graph structure constructed from the input IR of FIG. 4A in accordance with embodiments disclosed herein.

FIGS. 4A and 4B illustrate another example input IR 400 and corresponding graph structure 410 that may be constructed by the graph generator operation 232 of FIG. 2. The graph structure 410 comprises nodes 412-424, each representing a portion of the code instructions of the IR 400. In this case, for example, node 418 may be executed after or before executing nodes 412, 414, and/or 416, without invalidating the dependencies between the nodes. Thus, execution of the IR 400 can be performed by traversing the nodes 412-424 in a plurality of orders, each of which do not invalidate the dependencies between the instructions.

Returning to FIG. 2, the transformation engine 230 may also optionally execute a merge operation 234. The merge operation 234 is configured to interpret dependencies between instructions and combine a plurality of initial chains (e.g., initial distinct portions of the code instructions) together to create a merged chain of code instructions. The merged chain may comprise a portion of code instructions that is constructed from a plurality of initial, distinct portions of the code instructions. The merge operation 234 merges connected instructions based on merging criteria and/or preset merging parameters. The merging criteria may include, but is not limited to, ensuring that the semantics and/or dependencies of the code instructions of the input IR are not invalidated. An example of a preset merging parameter may be upper and lower limits to the number of merges performed, such that merges are performed to ensure that a maximum number of chains is not exceeded (e.g., an upper limit) and a minimum number of chains is met (e.g., a lower limit). In some embodiments, the maximum and/or minimum number of chains may be set by an operator of the sever 210 and/or may be determined by the server 210, for example, based on scoring metrics (described below). The numbers may be chosen to ensure necessary execution performance, target binary size, and security requirements are met.

The merge operation 234 may define one or more chains (initial or previously merged chains) as "hosts" of the merge and one or more other chains (initial or previously merged chains) as the "target". Defining hosts and target chains may be based on the dependencies between the portions of the code instructions that the host and target chains represent. For example, with reference to FIG. 3B, the merge operation discovers the dependency between chains 312 and 314 and identifies chain 312 as the host instruction and chain 314 as the target. Selecting the host and target may be arbitrary in some embodiments, while in others selection may be based on which chain occurs first (e.g., the chain located higher in the graph structure is the host). The merge operation 234 then appends the portion of the code instructions of the target chain to the portion of code instructions of the host chain to perform the merge (e.g., instructions for chain 314 are appended to the instructions for chain 312). The merge operation 234 then removes the node for the target chain and, as a result, updates the node of the host chain accordingly and updates the inputs, outputs, and links of the graph structure. In some embodiments, the merge operation 234 may identify a plurality of target chains (e.g., both chains 314 and 316 in the example of FIG. 3B) and merge all identified target instructions into the host chain and update the graph structure accordingly.

The merge operation 234 may be executed in a loop. In an example, after host chain(s) and target chain(s) are merged and the graph structure is updated accordingly, next host chain(s) and next target chain(s) may be identified. The next host chain may be previously merged chain(s) or initial chain(s) and the next target chain(s) may be initial (e.g., unmerged) chain(s) and/or previously merged chain(s). Once identified, the merge operation 234 performs the merge as described above. The merge operation 234 may perform iterative loops until the graph structure reaches a stable state where no further merges can be performed (e.g., remaining merged and/or unmerged chains are independent of each other).

The number of merges may be between 0 and the stable state and, in some embodiments, may be set as a preset merging parameter. For example, an operator of the server 210 may select an upper limit (e.g., a maximum number of chains) and a lower limit (e.g., a minimum number of chains) on the number of chains to be included in the graph structure. The number of chain merges performed by the merge operation 234 may be based on the upper and/or lower limits. For example, the merge operation 234 may perform merges in one or more iterative loops until the number of chains is less than or equal to the maximum number (e.g., the upper limit). The merge operation 234 may continue with iterative loops until either the number of chains in the graph structure is equal to the lower limit (if set in the server 210) or the graph structure reaches a stable state, whichever occurs first. The selection of the upper and lower limits may be based on balancing a tradeoff between performance and variability (e.g., fewer vs. more chains). For example, in real-world implementations, there may be hundreds, thousands, or more chains once stability is reached. Variability or randomization in executing the computer program may increase with the number of chains, but performance may be decreased due to processing time and resources required to generate the graph (and functions) and execute the machine code resulting from the randomization of the computer program. Furthermore, run-time performance and resources may be negatively impacted based on increasing the number of chains. Conversely, fewer chains may improve performance, but reduce variability. In some embodiments, the lower limit may be any desired number between 0 to the stable state and the upper limit may be any desired number between 0 and the stable state, as long as the lower limit (if set) is less than the upper limit (if set). In some embodiments, the merging parameters may be configured in the virtual machine information 235 and accessed by the merge operation 234, or the merging parameters may be configured in the merge operation 234.

Selection of which nodes and/or chains are merged may be based on a scoring system, such that the best merges (e.g., highest score merges) are prioritized. The scoring system of the merge operation 234 calculates a score metric for each proposed merge and ranks the proposed merges according to the calculate score (e.g., highest score to lowest score). Then the merge operation 234 performs the merges having the highest rank (e.g., highest score metric) first and continues through the ranked merges until the number of chains in the graph structure is equal to the lower limit (if set in the server 210) or the graph structure reaches a stable state, whichever occurs first.

In a first example, the score metric may be based on a comparison of the number of code instructions that would make up a resulting chain compared against a mean number of codes instructions in all other chains in graph structure, excluding chains involved by the proposed merge. This score metric may achieve a goal of promoting homogeneity across chains sizes, which may reduce overhead when executing the chains. For example, if there is a lot of variability in chain size across the graph structure, then a handler may be required to execute a chain of 20 codes instructions and also a chain of 100 codes instructions. The former chain would therefore incur a large performance overhead of "useless" or "dead" instructions on the handler (as described below). If the chains are of similar size (e.g., similar number of code instructions) then this overhead may be minimized. The proposed merges may be ranked according to an absolute difference between the number of code instructions and the mean number of code instructions for each respective propose, with proposed merges having a smaller absolute difference ranked above proposed merges having a larger absolute difference.

In a second example, the score metric may be based on the number of inputs and outputs for each chain. As the number of inputs and outputs increases, the execution overhead of the respective chain also increases. Thus, chains may be penalized based on the second metric. For example, the proposed merges may be ranked according to the number of inputs and outputs, with proposed merges having a fewer inputs and outputs ranked above proposed merges having a more inputs and outputs.

In some embodiments, proposed merges may be ranked according to the score metrics of the first and second examples. For example, proposed merges may be ranked according to the first example score metric and then refined based on the second example score metric. That is, the ranking of the proposed merges may be optimized based on balancing a first ranking based on the first example score metric and a second ranking based on the second example score metric.

The graph generator operation 232 constructs nodes representative of merged chains generated by the merge operation 234 and any unmerged (e.g., initial) chains. The graph generator operation 232 also constructs links representative of the updated pre- and post-dependencies (e.g., inputs and outputs) between merged and/or unmerged chains. The graph generator operation 232 then constructs the graph structure using the nodes and links, where the chains (merged or not) are represented as nodes and the dependencies represented by links between the nodes. Execution of the input IR can now be performed by traversing the graph in any valid order, executing each chain of instructions as each graph node is reached based on the links.

The graph structure generated by the graph generator operation 232 provides for at least the first type of misalignment of the computer program: different input values may cause the input algorithm to be executed in different orders making samples gathered also logically reordered. For example, if the input IR includes the source code of FIGS. 3A and 4A, a first input value from the end user device 250 may cause the computer program to execute the nodes of FIG. 3B prior to executing the nodes of FIG. 4B. A second input value from the end user device 250 may cause the computer program to execute the nodes of FIG. 4B before executing the nodes of FIG. 3B. In yet another example, a third input value may cause the computer program to execute node 418 of FIG. 4B, then execute the nodes of FIG. 3B, and finally execute the remaining nodes of FIG. 4B. Each order of execution may be unique to each input value. While the illustrated example provides an implementation having a certain number of nodes, it will be appreciated that as the number of chains increase the variability of execution for different input values increases accordingly.

Chains (merged or initial chains) may not be executed directly, instead the server 210 comprises a handler generator operation 236 configured to generate a plurality of function definitions (referred to herein as "handlers") capable of executing the chains. The handlers may be configured to execute a plurality of different chains at run-time on the end user device 250, and each chain may be executable on a plurality of different handlers.

To generate each handler, the handler generator operation 236 randomly selects a subset of the chains from the graph structure supplied by the graph generator operation 232 (referred to herein as "input chains"). The subset of chains may be selected based on implementing a random number generator to randomly select chains from those generated by the graph generator operation 232. Using the input chains, a single function definition is generated based on the code instructions included in each of the input chains. For example, each input chain in the subset comprises one or more portions of code instructions and a single function definition for a corresponding handler is generated by aggregating the one or more portions of code instructions such that the code instructions of all the input chains in the subset can be executed on the corresponding handler. A handler may be defined as the function definition comprising a linear sequence of functions that is generated to execute all of the portions of the code instructions of the input chains, such that a subset of the sequence of functions is used to execute each chain. A plurality of handlers is generated in this way by randomly selecting input chains and generating handlers until at least one handler is generated for each chain of the graph structure. Any two or more sets of input chains may comprise one or more common chains; however, due to the randomization of the selection, no two sets of input chains comprise an identical set of input chains.

In some embodiments, input chains may be randomly selected from a collection of chains. Initially, the collection contains all chains generated by the graph generator operation 232. Using a random number generator, the subset of input chains is selected from the collection. Once a give chain has reached at least the minimum level of handler support, the chain may be removed from the collection and no longer selectable as an input chain. The minimum level of handler support may be configurable in the virtual machine information 235. In an example, the minimum level of handler support may four handlers per chain, however any number may configured as desired. This process continues until all chains reach at least the minimum level of handler support. Similarly, the number of input chains that make up the subset may be configurable and/or hardcoded into the transformation engine 230. An example number of input chains may be four input chains. The number of chains may be based on benchmarking different numbers of input chains and balancing generating handlers capable of supporting sufficient numbers of chains against generating handlers that are unnecessarily expensive to execute (e.g., executing too many chains).

In various embodiments, during run-time at the end user device 250 and each time a respective handler is implemented, each respective handler executes all of the functions contained in its respective sequence and in the sequential order defined by the sequence of functions. This means functions not used by an executed chain are still executed by the handler in the order in which they are defined within the handler. Accordingly, from an attacker's perspective, unused functions still appear to be performing useful processing.

In some examples, the handler generator operation 236 is configured to keep track of which handler can validly execute which chains. For example, the handler generator operation 236 generates a mode parameter for each handler that maps chains used to generate each handler. A list of handler, mode parameter pairs is generated, where the mode parameter may list of chains that corresponding handler is able to validly execute. The handler, mode pairs may be stored in the virtual machine information 235, thereby permitting the transformation engine 230 to access the list at run-time. In some embodiments, the pairs may be encoded. The pairs may then be linked to respective chains, such that the information about each chain in the virtual machine information 235 contains a link to valid handlers based on the mode parameter.

Figure 5:
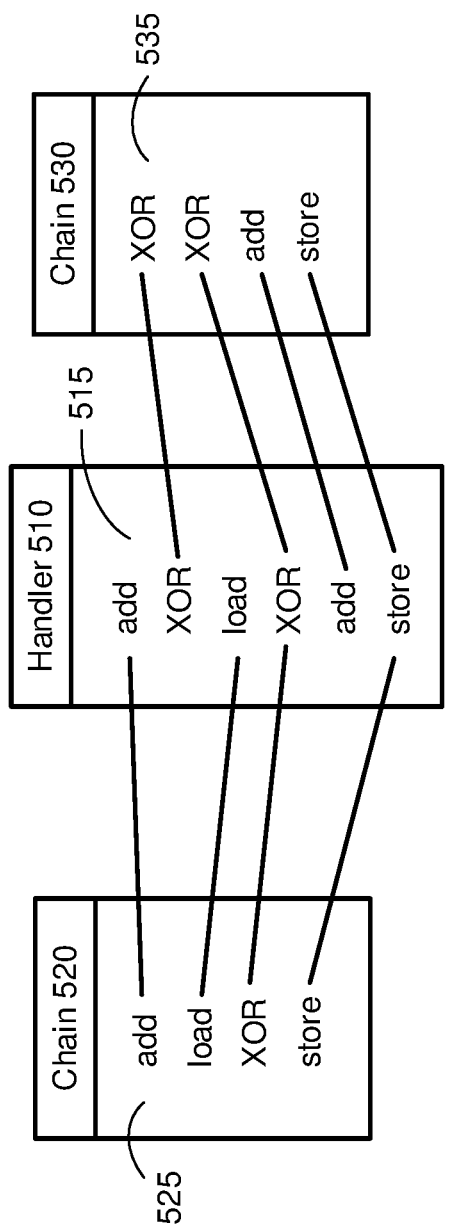
FIG. 5 illustrates a schematic diagram of an example handler generated by the transformation engine of FIG. 2 in accordance with embodiments disclosed herein.

FIG. 5 illustrates a schematic diagram of an example handler 510 generated by the handler generator operation 236 based on input chain 520 and input chain 530. As described above, input chains 520 and 530 may be randomly selected by the handler generator operation 236. While two input chains are illustrated in this example, it will be appreciated that the embodiments herein are not limited to two input chains and that any number of chains may be selected as input chains. In some embodiments, the number of input chains used for generating each handler need may be the same. While, the number of input chains for implementation of the transformation engine 230 may be varied as desired. That is, for example, each time target machine code is generated based on an execution of the transformation engine 230, a different number of input chains may be used. While, within a given execution of the transformation engine 230, the same number of input chains is used to generate each handler.

As illustrated in the example of FIG. 5, input chain 520 is constructed based on a first set of instructions 525 in the input IR and includes, for example, "add"; "load"; "XOR"; and "store." Input chain 530 is constructed based on a second set of instructions 535 in the input IR and includes, for example, a first "XOR"; a second "XOR"; "add"; and "store." In this example, input chains 520 and 530 may have been generated, along with a plurality of other chains, by the graph generator operation 232 and may be a result of merging a plurality of initial chains into chains 520 and 530, each comprising one of the instructions. While the example herein is described with reference to merged chains, it will be appreciated that similar processes may be applied to initial, unmerged chains.

Having randomly selected chains 520 and 530 as input chains, the handler generator operation 236 is configured to extract the first and second set of instructions 525 and 535. Based on the extracted instructions, the handler generator operation 236 aggregates the extracted instructions and structures them into a linear sequence 515 of functions. Using the linear sequence 515, the handler generator operation 236 constructs the function definition for the handler 510. For example, the handler generator operation 236 may recognize the sets of instructions 525 and 535 and extract each set in the order defined by the respective input chain. The extracted sets may then be compared against each other to identify an order for the linear sequence that maintains the validity of each input chain (e.g., an order of functions capable of executing each input chain), as shown in the linear sequence 515. The handler generator operation 236 then combines the functions for executing the portions of code instructions into the linear sequence 515. From the linear sequence 515, the function definition for handler 510 may be constructed so to execute the instructions of each input chain 520 and 530. Thus, in the example of FIG. 5, the handler 510 comprises the linear sequence 515 of all the instructions from the sets of instructions 525 and 535, which in this example include a first "add" function; a first "XOR" function (e.g., an exclusive logical operation); a "load" function; a second "XOR" function; a second "add" function; and a "store" function.

When the handler 510 is implemented during run-time at the user device 250, the handler 510 executes all functions contained in the linear sequence 515 each time it is implemented, while the chains executed by the handler may only utilize those instructions needed to perform instructions of each chain. For example, the handler executes input chain 520 by executing all of the functions in the linear sequence 515 on the chain 520, such that chain 520 executes the first "add" function, "load" function, second "XOR" function, and "store" function, while the remaining executed functions of the sequence 515 are unused by the input chain 520. Similarly, the input chain 530 can be executed by handler 510 by using corresponding functions of the linear sequence 515 as shown in FIG. 5, while the other functions are unused by the input chain 530. However, from an attacker's perspective, it would appear that all functions of the handler are utilized by a given chain because each function is executed regardless of usage by the chain.

While FIG. 5 illustrates a single handler and two chains, embodiments herein provide for generating a plurality of handlers for executing all chains from an input IR. As described above, each handler is generated from a subset of input channels that are randomly selected. Thus, each handler may execute a plurality of chains (as shown in FIG. 5). Furthermore, each subset of input chains need not be mutually exclusive. That is, a given chain may be used as an input chain for one or more handlers. Thus, each chain may be executed by a plurality of handlers.

Furthermore, a handler may incidentally be able to support execution of other chains without any modifications. That is, an incidental chain may be one that was not used by the handler generator operation 236 to generate a given handler, but nonetheless the function definition of the handler may be able to execute the chain due to the portions of the code instructions for the chain being matched to the linear sequence of the instructions in the function definition. These incidental matches can be used by embodiments to increase the coverage at no additional cost.

Due to the randomized selection of input chain subsets, multiple handlers may be configured that support executing a given chain, each of which will have different sequences of instructions within their respective function definition yet overlap with respect to the given chain. This aids desynchronization of the datasets generated by repeated execution of the computer program. For example, if a chain is able to be executed on a first handler and a second handler, yet the first and second handlers have different instruction types at the same point in the instruction sequence, then the execution of the chain cannot be synchronized between execution on the first and second handlers. For example, referring to FIG. 5, if a second handler is able to support execution of chain 530, but the command type at the third point in the linear sequence of the second handler is not "load" as in handler 510 (e.g., the command type of the third point in sequence 515), then the executions cannot be synchronized.

The selection of handler functions per chain, as described above, provides a second type of misalignment: different input values cause the same chains to be executed by different handlers causing the samples taken to be misaligned as the instruction sequences vary between handlers.

Returning to FIG. 2, the transformation engine 230 may include an entry function operation 238 configured to generate an external entry point function (also referred to as a "main function"). The entry point function may provide for receiving input value(s) from the end user device 250 for executing the input computer program. The entry function operation 238 may be configured to create a pseudo random number generator (PRNG) for generating sequence of numbers based on a seed value. The entry function operation 238 may also include converter function configured to use external input values (for example, input values received from the end user device 250) and convert the input values into the seed value. For example, the entry function operation 238 is configured to extract entropy from an input value to produce a seed value. Known techniques may be for extracting entropy. Thus, the seed value provides entropy to the PRNG, and is transformed from the input value. Transforming the seed value from the input value may ensure an attacker does not have direct visibility of the seed value. For example, input values may be processed in blocks via a series of "xor-shifts" (e.g., input buffers), with the bit-shift values randomly generates. This may be a hash algorithm Each input buffer may be processed to produce a hash value and the seed value can be generated by executing an XOR function on the hash values. The entry function operation 238 creates the entry point function from the PRNG and the converter.

In example implementations, the entry point function may process input value(s) received from the end user device 250 during run-time, each input value may correspond to an execution of the computer program, and produce a seed value for each input value. Each seed value may be used as an input to the PRNG, which constructs a sequence of numbers (e.g., a pseudo random sequence of numbers) based on the seed value for each execution of the machine code for the computer program. During run-time at the end user device 250, the entry point function inputs the seed value into the PRNG and uses the constructed sequence of numbers to randomly select a chain (initial or merged) of the graph structure. Once a chain is selected, the main function again queries the sequence of numbers constructed by the PRNG based on the seed value and uses the results to randomly select a handler and executes the selected chain on the handler. This process is repeated until exit conditions of the computer program are met. The sequence of numbers generated by the PRNG may be a pseudo random sequence of numbers and may be unique to each input value. In some embodiments, the handler may be randomly selected and then a chain to be executed may be randomly selected.

For example, as described above, the seed value may be produced by one or more hashing input buffers to produce a hash value per buffer. The hash values are combined (if there are multiple input buffers, otherwise there is only one hash value) to produce the seed value. The entry point function uses the seed value as an input into the PRNG, and the uses the resulting sequence of numbers to retrieve one of an array of chains for execution. For example, a next chain to be execute may be selected from an array of possible chains (e.g., pre-calculated list of valid chains). The array may contain any number of chains, for example, 4, 8, 16, etc. possible chains. In some embodiments, the entry point function may also perform a check that the selected chain can be validly to executed. If the check fails another chain may be randomly selected from the array until an executable chain is found. Selection of a handler for executing a chain may be performed in a similar manner, e.g., randomly selects a handler from a pre-calculated list of valid handlers, one of which is selected based the sequence of numbers from the PRNG. The pre-calculated list may be determined upon initialization of the transformation engine and included in the virtual machine information 235.

The transformation engine 230 also comprises a code generator 239 configured to transform the input IR into a transformed IR. To transform the input IR to the transformed IR, the code generator 239 may use the graph structure (including merged chains and/or initial chains and links) generated by the graph generator operation 232, the plurality of handlers generated by the handler generator operation 236, and the entry point function from the entry function operation 238 to generate source code for the transformed IR. The transformed IR comprises source code for the graph structure and handlers, which are both combined with source code for the entry function operation 238.

For example, the source code of the transformed IR may comprise a byte array containing encoded data (e.g., which may be stored in the virtual machine information 235), the plurality of handlers (e.g., plurality of function definitions), and the entry point function. The chains may not be explicitly encoded in either the data or the source code generated at code generator 239. Instead various pieces of data relating to the chains may be generated by the graph generator 232 and stored in the virtual machine information 235 byte array. In various embodiments, the data relating to the chains may be duplicated and/or contains multiple valid but different options for the chain which can be randomly selected at run-time. This data relating the chains may include encoded valid orderings of the global chain graph, lists of valid handler calls for each chain, lists of indices to be used by handlers during run-time, etc.

As described above, each handler defines a sequence of IR instructions. The code generator 239 generates a function (e.g., a C function in some examples) with a common interface. During run-time, these functions may begin by selecting a set of indices (or other data) which correspond to the randomly selected chain for execution. The indices may then be used to load inputs into a local data array of the virtual machine information 235 to locate the chain. The sequence of IR instructions for a handler may then rendered making use of indexed operands which allows different chains to use different operands of the same IR instruction. The IR instructions are emitted linearly with the results written to the local data array. Following the instructions, the linear sequence of instructions for the handler writes chain outputs from the local array to memory of the server 210.

The entry point function, according to various embodiments, comprises code to initialize the transformation engine 230. This may include code for hashing the input value to produce the seed value, initializing dynamic data used by the transformation engine 230, etc. The entry point function may also comprise a series of nested loops which execute a traversal of the chain graph by randomly selecting chains to execute and randomly selecting a valid handler for each randomly selected chain.

The transformation engine 230 then supplies the transformed IR to the middle end 140 and back end 145. While FIG. 2 illustratively shows the middle end 140 and the back end 145 as a single component, the middle end and back end of FIG. 2 are substantially the same as the middle end and back end of FIG. 1. For example, the middle end 140 may be configured to perform optimizations on the transformed source code, as described above in connection to FIG. 1, to generate an optimized transformed IR. The optimized transformed IR may be used by the back end to generate machine code (e.g., target binary) specialized for the particular processor and operating system of the end user device 250.

The output machine code is then supplied to the end user device 250 and can be executed thereon. In the illustrative example, input value(s) are provided to the machine code by the end user device 250 based, for example, on used inputs into the end user device 250. As described above, the input value(s) are each used to produce a respective seed value that the entry point function uses as an input into the PRNG to construct a respective pseudo random sequence of numbers. To use the graph structure represented in the machine code, the entry point function is executed to input the seed value into the PRNG, randomly select a chain represented in the machine code based on the results from the PRNG, and then queries the sequence of numbers from the PRNG again to randomly select a handler for executing the selected chain. A next chain is selected by querying the sequence of numbers and the process repeats until the exit conditions of the computer program are met.

Figure 6:
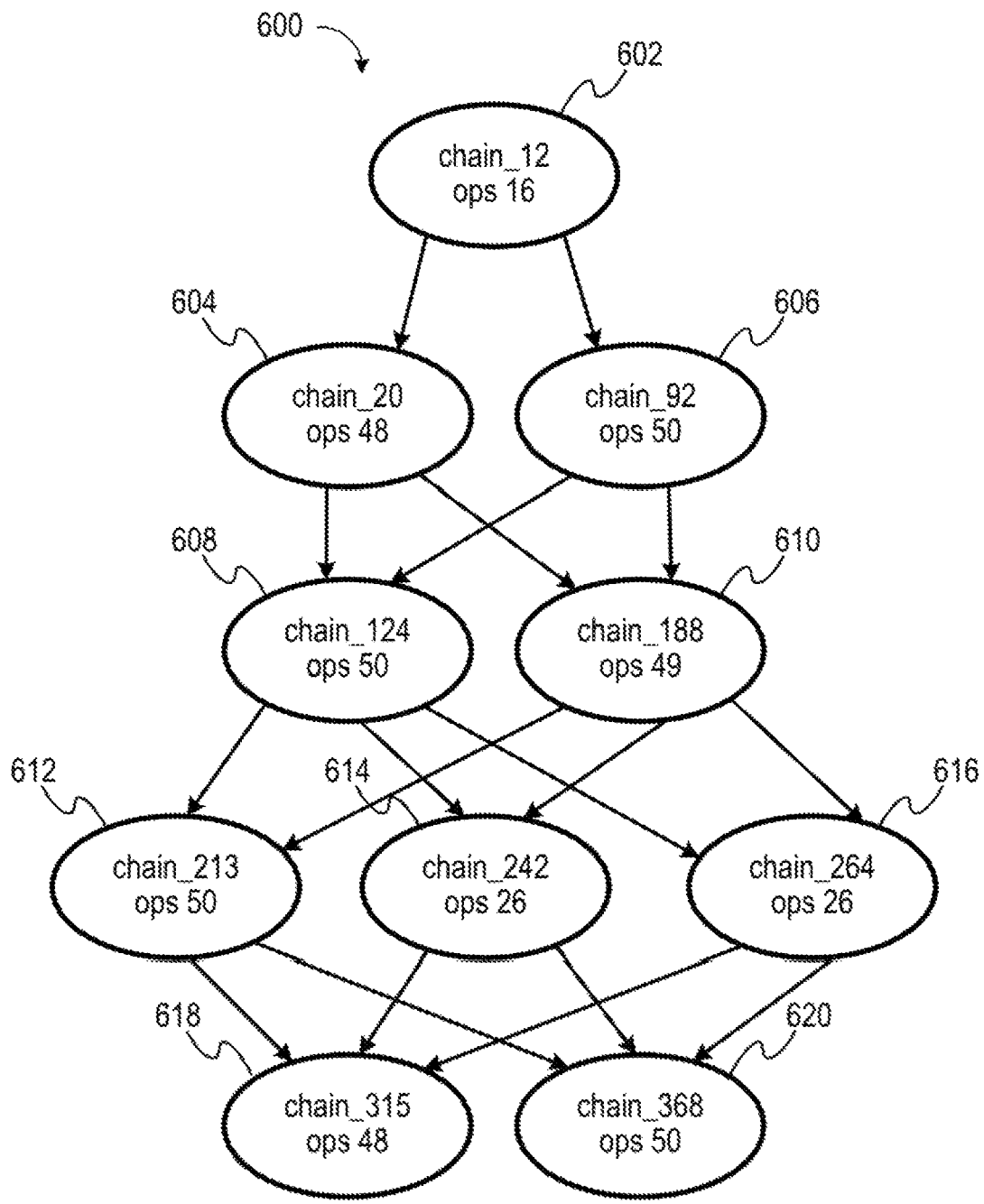
FIG. 6 illustrates a portion of another example graph structure generated by the transformation engine of FIG. 2 in accordance with embodiments disclosed herein.

FIG. 6 illustrates a portion of an example graph structure 600 generated by the transformation engine 230 in accordance with embodiments disclosed herein. The graph structure 600 includes, for example, a plurality of nodes 602-620 and a plurality of links between each node. For example, as described above, the transformation engine 230 may receive an input IR (e.g., an IR from the front end 110 or an white body protected IP from the white box cryptography algorithm 220) and analyzes the source code of the input IR to identify the code instructions (e.g., initial chains) and pre- and post-dependencies between the chains. The transformation engine 230 may also perform the merge operation 234 to merge one or more initial chains as described above. Nodes 602-620 and links are then constructed from the identified chains (initial and/or merged chains as applicable) and dependencies, respectively, such that each node is representative of either an initial chain or a merged chain and the links are representative of the dependencies between given chain and upstream and downstream chains. The graph structure 600 is used to create source code for the transformed IR that is supplied to the middle end 140 and back end 145 to generate the machine code (e.g., target binary) that is executable at the end user device 250.

Each node 602-620 in FIG. 6 is labeled with a chain number (e.g., chain_12, chain_20, . . . chain_368). The chain numbers illustrate that embodiments herein may be significantly more complex than the examples of FIGS. 3A-4B, and may include hundreds of chains. For example, in the illustrative example of FIG. 6, the chain numbers illustrate that the graph structure 600 includes at least 368 chains, where the portion shown in FIG. 6 illustrates only those chains of the 368 linked together.

Each node 602-620 also includes an operation number (e.g., ops 16, ops 48, etc.), which indicates of a number of operations (e.g., functions and/or code instructions) included in each chain represented by each node. For example, node 602 is representative of chain_12 that comprises 16 code instructions. Similarly, node 604 and node 606 represent chains having 48 code instructions and 50 code instructions, respectively. Accordingly, the operation number shown in the illustrative example highlights that chains used at the same point in the process do not need to be the same size (e.g., do not need to have the same number of code instructions, as explained above in connection with FIG. 5).

During execution at the end user device, the nodes (and thus the represented chains) may be executed in any order that does not invalidate the links (e.g., dependencies between the chains of the graph structure). The end user device 250 may supply input value(s) to execute the machine code of the computer program, and as described above, the entry point function inputs the seed value the PRNG to construct a sequence of numbers and randomly select a node for starting the execution. In some embodiments, the selected node is randomly selected from a list of valid candidate nodes, where a node is a valid candidate if all predecessor nodes have been executed. At a point later, the sequence of numbers is queries again to randomly select another node for execution. Accordingly, the selection of each subsequent node for execution may be performed in a loop, each iterative loop randomly selecting a chain based on the sequence of numbers constructed by inputting the seed value into the PRNG. In some embodiments, chains available for execution for selection may be based on the output from the executed chain. For example, in FIG. 6 chains 604-620 are not available for selection for execution until chain 602 is executed. Similarly, chain 620 would not be available for selection until each of chains 612-616 are executed.

For example, the end user device 250 supplies a first input value which causes the entry point function to produce a first seed value and inputs the first seed value into the PRNG, which constructs a first sequence of numbers using the first seed value. The entry point function queries the first sequence of numbers to select, for example, chain 602 (as, in this example, all subsequent chains depend on the result of chain 602). In some embodiments, the selected chain is randomly selected from a list of valid candidate chains, where a chain is a valid candidate if all predecessor chains have been executed. As described above, the first sequence of numbers is queried again to randomly select a handler from a plurality of handlers for executing the code instructions of chain 602. After all functions of the selected handler are executed including executing chain 602, the entry point function queries the first sequence of numbers again to randomly select a next chain for execution. In this example, the result of the PRNG may be used to select one or more of chains 604 and 606 for execution. The first sequence of numbers is queried again to randomly select a next handler from the plurality of handlers for executing the code instructions of the selected one or more of chain 604 and chain 606. This handler may be the same or a different handler as that used to execute the chain 602, assuming the linear sequence of functions of the selected handler is capable of executing the code instructions of both chain 602 and the selected one or more of chain 604 and chain 606.

In the case that chain 604 is selected, once all functions of the selected handler are executed including executing chain 604, the entry point function queries the first sequence of numbers again to randomly select a next chain for execution. The first sequence of numbers may be used to select one or more of chains 606 and 608 for execution. The first sequence of numbers is then queried again to randomly select a next handler from the plurality of handlers for executing the code instructions of the selected chain. Whereas, in the case that chain 606 is selected, once all functions of the selected handler are executed including executing chain 606, the entry point function queries the first sequence of numbers again to randomly select a next chain for execution. The process then iteratively loops, randomly selecting nodes for execution that are available to ensure valid dependencies are maintained until all nodes are executed and the exit conditions are satisfied.

Subsequently, the end user device 250 supplies a second input value which causes the entry point function to produce a second seed value. The second seed value is input into the PRNG, which constructs a second sequence of numbers using the second seed value. The entry point function uses the results of the PRNG to select chains and handlers as described above, looping through the chains based on querying the second sequence of numbers constructed by the PRNG using the second seed value until the exit conditions are satisfied. Where the second input value is different from the first input value, the entry point function produces a second seed value that is different from the first seed value and the constructed first sequence of numbers is different from the second sequence of numbers. Thus, the order that the chains are executed for the second input differs from the first, and handlers selected to execute each chain based on the second input differ from the first input as well.

The above example is a simplified example of a set of nodes. Real world implementations may involve nodes totaling hundreds, thousands, or more each linked in various ways based on their dependencies. Accordingly, by using a PRNG to select each chain for execution, the order of the chains is randomized in numerous different and unpredictable ways. Furthermore, using the PRNG to select a handler from a plurality of different handlers for executing each randomly selected chain results in further unpredictable misalignment.

Accordingly, the embodiments disclosed herein transform source code of a computer program such that during runtime at an end user device the machine code of the computer program behaves such that producing a set of aligned traces is highly improbable. For example, by randomly selecting chains for execution, the first type of misalignment is achieved (e.g., different input values cause the computer program to be executed in different orders). Furthermore, the second type of misalignment is achieved by selecting handlers per chain (e.g., different input values cause the same chains to be executed by different handlers causing the samples taken to be misaligned as the instruction sequences vary between handlers). Thus, side-channel attacks that execute multiple traces are unable to align and synchronize each trace, thereby invalidating datasets generated by the side-channel attacks.

Figure 7:
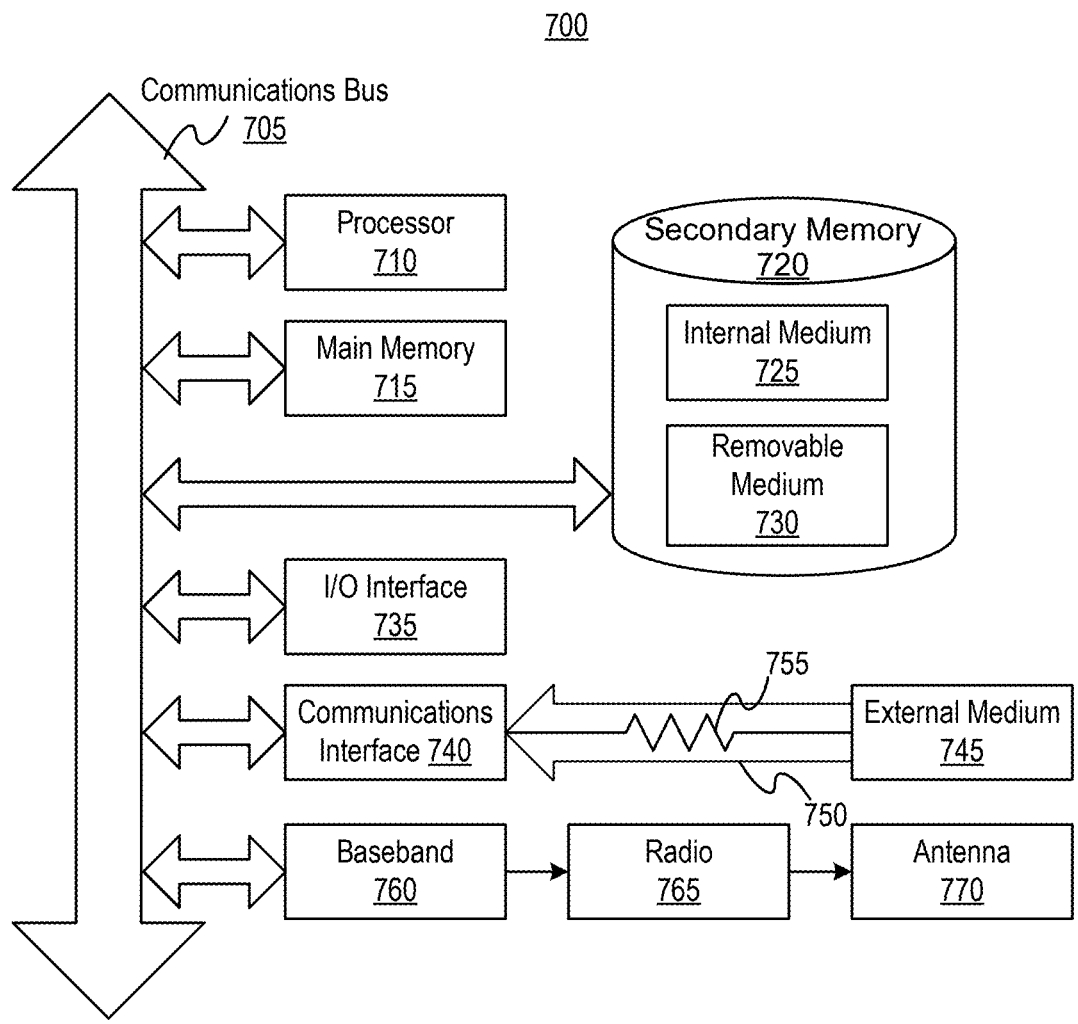
FIG. 7 illustrates a wired or wireless computing system on which one or more of the processes described herein may be executed, according to an embodiment.

FIG. 7 is a block diagram illustrating an example wired or wireless computing system 700 that may be used in connection with various embodiments described herein. For example, the system 700 may be used as or in conjunction with one or more of the mechanisms, processes, methods, or functions (e.g., to store and/or execute one or more software modules) described above, and may represent components of server 210, end user device 250, and/or other devices described herein. The system 700 can be a server or any conventional personal computer, or any other processor-enabled device that is capable of wired or wireless data communication. Other computer systems and/or architectures may be also used, as will be clear to those skilled in the art. In addition, it should be understood that while system 700 is illustrated with certain elements, it may comprise fewer or more elements than those illustrated, depending on the particular component it represents. For example, a system 700 without wireless communication capabilities may not include baseband 760, radio 765, and antenna 770.

The system 700 preferably includes one or more processors, such as processor 710. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 710. Examples of processors which may be used with system 700 include, without limitation, the Pentium® processor, Core i7® processor, Xeon® processor, and other models available from Intel Corporation of Santa Clara, California, as well as hardware processors from other manufacturers, such as Advanced Micro Devices of Sunnyvale, California.

The processor 710 is preferably connected to a communication bus 705. The communication bus 705 may include a data channel for facilitating information transfer between storage and other peripheral components of the system 700. In addition, the communication bus 705 may provide a set of signals used for communication with the processor 710, including a data bus, address bus, and control bus (not shown). The communication bus 705 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 700 preferably includes a main memory 715 and may also include a secondary memory 720. The main memory 715 provides storage of instructions and data for programs executing on the processor 710, such as one or more of the functions and/or modules discussed above and illustrated in at least FIGS. 2-6. It should be understood that programs stored in the memory and executed by processor 710 may be written and/or compiled according to any suitable language, including without limitation, C/C++, Java, JavaScript, Perl, Visual Basic, .NET, proprietary visual scripting languages, proprietary scripting languages, and the like. The main memory 715 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 720 may optionally include an internal memory 725 and/or a removable medium 730, for example a floppy disk drive, a magnetic tape drive, a compact disc (CD) drive, a digital versatile disc (DVD) drive, other optical drive, a flash memory drive, microSD, etc. The removable medium 730 is read from and/or written to in a well-known manner. Removable storage medium 730 may be, for example, a floppy disk, magnetic tape, CD, DVD, SD card, thumb drive, etc.

The removable storage medium 730 is a non-transitory computer-readable medium having stored thereon computer executable code (i.e., software) and/or data. The computer software or data stored on the removable storage medium 730 is read into the system 700 for execution by the processor 710.

In alternative embodiments, secondary memory 720 may include other similar means for enabling computer programs or other data or instructions to be loaded into the system 700. Such means may include, for example, an external storage medium 795 and an interface 740. Examples of external storage medium 795 may include an external hard disk drive, an external optical drive, or an external magneto-optical drive.

Other examples of secondary memory 720 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 730 and communication interface 740, which allow software and data to be transferred from an external medium 760 to the system 700.

System 700 may include a communication interface 740. The communication interface 740 allows software and data to be transferred between system 700 and external devices (e.g., printers), networks, or information sources. For example, computer software or executable code may be transferred to system 700 from a network or cloud server via communication interface 740. Examples of communication interface 740 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 700 with a network or another computing device.

Communication interface 740 preferably implements industry-promulgated protocol standards, such as Ethernet IEEE 802 standards, Fiber Channel, digital subscriber line (DSL), asynchronous digital subscriber line (ADSL), frame relay, asynchronous transfer mode, integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 740 are generally in the form of electrical communication signals 755. These signals 755 are preferably provided to communication interface 740 via a communication channel 750. In one embodiment, the communication channel 750 may be a wired or wireless network, or any variety of other communication links. Communication channel 750 carries signals 755 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 715 and/or the secondary memory 720. Computer programs can also be received via communication interface 740 and stored in the main memory 715 and/or the secondary memory 720. Such computer programs, when executed, enable the system 700 to perform the various functions of the present invention as previously described.

In this description, the terms "computer-readable medium," "storage medium," and "medium" are used to refer to any non-transitory computer readable storage media used to provide computer executable code (e.g., software and computer programs) to the system 700. Examples of these media include main memory 715, secondary memory 720 (including internal memory 725, removable medium 730, and external storage medium 795), and any peripheral device communicatively coupled with communication interface 740 (including a network information server or other network device). These non-transitory computer readable mediums are means for providing executable code, programming instructions, and software to the system 700.

In an embodiment that is implemented using software, the software may be stored on a computer-readable medium and loaded into the system 700 by way of removable medium 730, I/O interface 735, or communication interface 740. In such an embodiment, the software is loaded into the system 700 in the form of electrical communication signals 755. The software, when executed by the processor 710, preferably causes the processor 710 to perform the inventive features and functions previously described herein.

In an embodiment, I/O interface 735 provides an interface between one or more components of system 700 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 700 also includes optional wireless communication components that facilitate wireless communication over a voice and over a data network. The wireless communication components comprise an antenna system 770, a radio system 765 and a baseband system 760. In the system 700, radio frequency (RF) signals are transmitted and received over the air by the antenna system 770 under the management of the radio system 765.

In one embodiment, the antenna system 770 may comprise one or more antennae and one or more multiplexors (not shown) that perform a switching function to provide the antenna system 770 with transmit and receive signal paths. In the receive path, received RF signals can be coupled from a multiplexor to a low noise amplifier (not shown) that amplifies the received RF signal and sends the amplified signal to the radio system 765.

In alternative embodiments, the radio system 765 may comprise one or more radios that are configured to communicate over various frequencies and protocols. In one embodiment, the radio system 765 may combine a demodulator (not shown) and modulator (not shown) in one integrated circuit (IC). The demodulator and modulator can also be separate components. In the incoming path, the demodulator strips away the RF carrier signal leaving a baseband received signal, which is sent from the radio system 765 to the baseband system 760.

If the received signal contains audio information, then baseband system 760 decodes the signal and converts it to an analog signal. Then the signal is amplified and sent to a speaker. The baseband system 760 also receives analog signals from a microphone. These analog audio signals are converted to digital signals and encoded by the baseband system 760. The baseband system 760 also codes the digital signals for transmission and generates a baseband transmit audio signal that is routed to the modulator portion of the radio system 765. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 770 where the signal is switched to the antenna port for transmission.

The baseband system 760 is also communicatively coupled with the processor 710. The central processing unit 710 has access to data storage areas 715 and 720. The central processing unit 710 is preferably configured to execute instructions (i.e., computer programs or software) that can be stored in the memory 715 or the secondary memory 720. Computer programs can also be received from the baseband system 760 and stored in the data storage area 715 or in secondary memory 720, or executed upon receipt. Such computer programs, when executed, enable the system 700 to perform the various functions of the present invention as previously described. For example, data storage areas 715 may include various software modules (not shown).

Various embodiments may also be implemented primarily in hardware using, for example, components such as application specific integrated circuits (ASICs), or field programmable gate arrays (FPGAs) Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

Those of skill will appreciate that the various illustrative steps and processes described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure.

The various steps and processes (functions) described herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including non-transitory computer readable medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

The various illustrative logical or functional blocks and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative blocks and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

What is claimed is:

1. A method of protecting a computer program against side-channel attacks, the method comprising:
   receiving input source code of the computer program, the source code comprising code instructions of the computer program;
   generating a graph structure representative of the code instructions, the graph structure comprising nodes representative of portions of the code instructions and links representative of dependencies between the portions of the code instructions, wherein the nodes can be traversed in a plurality of orders without invalidating the dependencies between the portions of the code instructions;
   constructing a plurality of function definitions based on the graph structure, each function definition is configured to execute one or more nodes of the graph structure and each node of the graph structure is executable by one or more function definitions;
   transforming the input source code into transformed source code based on combining the graph structure and the plurality of function; and
   wherein the method further comprising:
      identifying portions of the code instructions and constructing the nodes based on the identified portions of the code instructions;
      for each code instruction, identifying dependencies between a respective portion of the code instructions based on inputs into and outputs from the respective portion of the code instructions;
      generating the links based on the identified dependencies;
      merging subsets of the nodes based on the dependencies between each subset of the nodes;
      appending the portions of the code instructions represented by at least a first node of the subset to the code instructions represented by at least a second node of the subset;
      removing the at least the second node from the graph structure; and
      updating the graph structure based on the merge.

2. The method of claim 1, wherein the input source code is transformed into the transformed source code such that the transformed source code can be executed by a target device, such that the transformed source code receives input values from the target device, selects an order of the plurality of orders for executing the graph structure based on each input value, and, based on each input value, selects a function definition from the plurality of function definitions for executing each node, where the selected order and selected function definitions are unique to each input value.

3. The method of one of claim 1, wherein the input source code is an intermediate representation (IR) of the source code of the computer program.

4. The method of claim 3, wherein the IR is received from a compiler.

5. The method of claim 3, wherein the IR is a white body protected IP received from a cryptography algorithm.

6. The method of claim 5, wherein the cryptography algorithm is a white box cryptography algorithm.

7. The method of claim 3, wherein the IR is provided according to LLVM compiler infrastructure.

8. The method of claim 1, further comprising:
   looping through iterative mergers of subsets of the nodes until the graph structure reaches a stable state or a number of nodes of the graph structure is less than or equal to a preset number.

9. A method of protecting a computer program against side-channel attacks, the method comprising:
   receiving input source code of the computer program, the source code comprising code instructions of the computer program;
   generating a graph structure representative of the code instructions, the graph structure comprising nodes representative of portions of the code instructions and links representative of dependencies between the portions of the code instructions, wherein the nodes can be traversed in a plurality of orders without invalidating the dependencies between the portions of the code instructions;
   constructing a plurality of function definitions based on the graph structure, each function definition is configured to execute one or more nodes of the graph structure and each node of the graph structure is executable by one or more function definitions;
   transforming the input source code into transformed source code based on combining the graph structure and the plurality of function; and
   wherein constructing the plurality of function definitions comprises:
      randomly selecting input nodes from the nodes of the graph structure; and
      constructing a sequence of functions based on the portions of the code instructions represented by the input nodes, wherein the sequence of functions is configured to execute all the portions of the code instructions of the input nodes.

10. The method of claim 9, wherein the sequence of the code instructions is a linear sequence of functions based on aggregating the portions of the code instructions of the input nodes.

11. The method of claim 9, wherein transforming the input source code comprises creating a pseudo random number generator and a converter configured to generate a seed value.

12. The method of claim 11, wherein, when the computer program is executed by the target device, the transformed source code produces a seed value based on each input value, inputs the seed value into the pseudo random number generator, and iteratively selects a node of the graph structure for execution based on a result of from the pseudo random number generator, wherein each seed value is unique to each input value.

13. The method of claim 11, wherein, when the computer program is executed by the target device, the transformed source code produces a seed value based on each input value, inputs the seed value into the pseudo random number generator, and iteratively selects a function definition from the plurality of function definition for executing a node of the graph structure, wherein each seed value is unique to each input value.

14. A system for protecting a computer program against side-channel attacks, the system comprising:
   at least one memory configured to store instructions; and
   at least one processor communicatively connected to the at least one memory, the at least one processor configured to execute the program to perform the method of claim 1.

15. A non-transitory computer-readable storage media storing instruction that, when executed by a computer, cause the computer to perform the method of claim 1.

16. A device for protecting a computer program against side-channel attacks, the device comprising:
   a means for receiving input source code of the computer program, the source code comprising code instructions of the computer program;
   a means for generating a graph structure representative of the code instructions, the graph structure comprising nodes representative of portions of the code instructions and links representative of dependencies between the portions of the code instructions, wherein the nodes can be traversed in a plurality of orders without invalidating the dependencies between the portions of the code instructions;
   a means for constructing a plurality of function definitions based on the graph structure, each function definition is configured to execute one or more nodes of the graph structure and each node of the graph structure is executable by one or more function definitions; and
   a means for transforming the input source code into transformed source code based on combining the graph structure and the plurality of function; and
   wherein the means for constructing the plurality of function definitions comprises:
      means for randomly selecting input nodes from the nodes of the graph structure, and
      means for constructing a sequence of functions based on the portions of the code instructions represented by the input nodes, wherein the sequence of functions is configured to execute all the portions of the code instructions of the input nodes.

* * * * *